UNITED STATES PATENT OFFICE.

BYRON E. ELDRED, OF BRONXVILLE, NEW YORK, ASSIGNOR TO COMBUSTION UTILITIES COMPANY, OF NEW YORK, N. Y.

PROCESS OF OXIDIZING ORES.

932,689.  Specification of Letters Patent.  Patented Aug. 31, 1909.

No Drawing.  Application filed February 1, 1906.  Serial No. 299,045.

*To all whom it may concern:*

Be it known that I, BYRON E. ELDRED, a citizen of the United States, residing in Bronxville, in the county of Westchester and State of New York, have invented a certain new and useful Process of Oxidizing Ores, of which the following is a specification.

This invention relates to processes of oxidizing ores, and consists in a method of roasting or otherwise oxidizing sulfid ores with dilute gas mixtures; all as more fully hereinafter set forth, matters of novelty being particularly pointed out in the appended claims.

Most of the heavy metals occur to a greater or less extent in the form of sulfid ores, and these ores for utilization in the arts must be first roasted or otherwise oxidized. Oxidation of sulfid ores in the air while often difficult to start, and often requiring a relatively high temperature for that purpose, is in general highly exothermic when once begun and, like all highly exothermic reactions, is self-accelerating; with rich ores tending to propagate itself with ever increasing velocity through the mass. Heat is liberated not only by the combustion of the sulfur to dioxid or trioxid, but frequently also by the oxidation of the metal base itself, and in some cases, by the union of the oxid produced with the sulfur acid, as in the formation of copper sulfate, lead sulfate, etc. In a confined mass of very rich ore, such as pyrites, copper glance, etc., excessively high temperatures may be, and often are, attained. This development of heat and violence of reaction is detrimental in the extreme when roasting rich ores, and some means of control has long been a desideratum in the art. The sulfids as a rule are quite fusible and if heated beyond a certain point they melt down, decreasing the surface exposed to air, tending to inclose portions of unchanged sulfids and giving products which are not porous and open in texture, as is usually desirable, but which are apt to be more in the nature of a sintered mass or matte. Proper roasting of rich sulfid ores is usually regarded as difficult in the extreme, and in the prior art, inventors have gone so far as to convert such rich ores into poor ores by mixing in inert bodies, such as limestones, silica, etc. The advantage gained by checking the rate of combustion and the accumulation of heat and thereby attaining a porous, properly burned product, free from fused portions, has been held to overbalance the inconvenience of afterward separating the impurity purposely added. On the other hand, with poor sulfid ores in which the amount of gangue present is so great as to necessitate the use of extraneous heat to start and maintain the oxidation, with present methods of firing it is also difficult to secure good results. Control of temperatures is not easy, and the margin of temperature between that degree at which the ore ignites and that at which it melts down, is frequently very narrow. The flame atmosphere employed for heating must of necessity be oxidizing. But all ordinary oxidizing flames are extremely short and of limited volume. Therefore in practice in this art, reliance has heretofore been placed mainly on heating by the sensible heat of the products of combustion from such a flame, many and ingenious forms of apparatus having been devised to employ such heat to the best advantage. But they all suffer from the radical defect in principle, that sensible heat is given up to the first cooler object encountered. Therefore, charges of ore in any given furnace are extremely apt to be overburned in one place and underburned in another. The same difficulties are of course encountered in roasting even rich ore since it is necessary to start combustion with flame heat of some kind. When, as often happens, the gangue of an ore is in itself easily fusible, the difficulties are accentuated. Again, arsenic is very frequently present in sulfid ores and very great care is necessary in the roasting in such cases. By reason of these facts, sulfid roasting is today an uncertain and relatively expensive operation and high-priced skilled labor is generally considered necessary in the art. But in the present invention I have devised a simple, cheap and easy method of controlling the temperature of the roasting ore, of checking unduly rapid oxidation or facilitating that which is too slow, of regulating the progress of the reaction with any degree of nicety required, of automatically checking any local tendency to become over-heated in any portion of the mass of ore being treated and thereby securing evenness of treatment, and of producing with certainty any oxidized or other product desired from any given ore.

Rapidity of combustion is a phenomenon depending as much upon the relative mass or concentration of the oxidant as upon that of the substance oxidized; and it may be varied by varying the concentration of either. For many purposes, as in this art, it may be said that common combustibles, such as coal, are too concentrated and air itself, so to speak, is also too concentrated; it gives rise to oxidizing reactions too violent and uncontrollable in their nature. For instance, as already stated, in the combustion of coal with an excess of air the result is a short, small, intensely hot flame, whose area is not sufficient for many purposes. With such a flame, sensible heat, in lieu of developing heat, must be relied upon in treating such a large mass as a few tons of ore; this reliance being further forced by the fact that direct impingement of such a flame on the ore would not be safe because of its inordinate temperature. Such a flame is further wasteful of fuel as well as inefficient.

I have discovered that the difficulties hitherto attending the practice of the art of oxidizing sulfids may be simply, easily and readily obviated by the use of diluted oxidizing atmospheres, either of a flaming character where extraneous heat is to be applied, or of a non-flaming nature where an exothermic reaction is to be restrained. Frequently, atmospheres of both characteristics will be successively applied in roasting rich sulfid ores. With rich copper glance for instance, it is desirable to start oxidation with a heat developing flaming atmosphere, continue and retard it with a heat absorbing or reaction-checking atmosphere, and usually to finally finish with another heat developing atmosphere. For with a combustion of the sulfid of the slow and regulated character which I desire, heat must generally be added to complete the oxidation of the last portions of sulfid in such ores. Where oxidizing of rich ores is not carried on as a roasting operation, pure and simple, but is more in the nature of a smelting operation, as in pyritic smelting, a diluted non-flaming oxidizing atmosphere is usually alone employed, the dilution being varied inversely as the heat required. This type of atmosphere may also usefully be employed in roasting in continuous furnaces where hot nearly finished ore advances through a draft current in the opposite direction, and also in certain roasting operations where the draft current is employed hot. The diluted flaming atmosphere is also useful alone, particularly in the case of poor ores and such as need extraneous heat.

While any indifferent gas would answer as a diluent in making the diluted atmosphere employed, in practice I prefer to use products of combustion, either from a fuel burning furnace or from the ore furnace itself. The latter have preferable characteristics in certain relations, hereinafter pointed out; the former in certain other relations; but generally they are more or less interchangeable. Where the diluted atmosphere is to have flaming, or heat evolving characteristics, it is to be mixed with a modicum of combustible gas. Such an atmosphere, for instance, may be produced by a mixture of any combustible gas with an excess of air over that necessary to burn it and with more or less products of combustion. The latter constituent acts to retard combustion both by virtue of the simple dilution and also by reason of the laws of mass action; the tendency which carbon dioxid exercises to restrain the formation of more carbon dioxid. Such a mixture may be made as tardily burning as desired; i. e., while its combustible develops no less total heat in burning than it would in a concentrated condition, the evolution is extended over a larger area and a greater time; area and time being controllable over indefinitely wide limits. In other words, such a flame may be made of any temperature desired. Its oxidizing power is controllable by regulating the amount of gases and neutral diluent used. Obviously, either may be controlled by manipulating a valve or two, changing the proportions of the constituents of the mixture. Such a mixture may be made by admixing the three constituents direct in such proportions as the needs of the moment may require. In making the mixture of air and diluent and combustible, it is in general advisable, to avoid explosion and the necessity of elaborate apparatus, to admix the combustible gas and the products of combustion prior to admixing the air. Commonly, the exigencies of the roasting or oxidizing operation will require changes of proportions of the constituents of the draft current continuously.

The flaming atmosphere may, very advantageously, be made from solid fuel by the simple expedient of forcing a draft of controlled proportions of air and products of combustion through a bed of ignited fuel at a rate faster than the fuel can react therewith. The result is a tardily burning gas mixture consisting of carbon monoxid from the fuel, excess of carbon dioxid and nitrogen from the products of combustion and of the excess of air. The air is distributed throughout the entire effluent gas mass in thorough admixture with the combustible gas (CO) but combustion is slackened by the diluent nitrogen and carbon dioxid, the latter having also a chemical restraining influence over the velocity of combustion. Combustion is not ordinarily completed till the gas mass comes into proximity to the heat radiating walls of a furnace chamber. In another application pending concurrently herewith and now matured into Patent No.

819,045, May 1, 1906, I have described and claimed the art of heating reverberatory furnaces by a tardily burning gas mass of this character. In the present invention, however, I preferably use a somewhat different gas mass, carrying more oxygen, as I design it for oxidizing purposes primarily rather than simple heating, and less combustible gas. As the active retarding agent in products of combustion from fuel used for dilating flaming gas masses of the character described is carbon dioxid, in cases where a larger amount of carbon dioxid is required than is given off by fuel, the waste gases from cement or lime kilns, or other calcining furnaces which contain more of this body than ordinary fuel gases, may be usefully employed. This operation both in the patented process and in that herein described result in an admixture of unchanged air, nitrogen, carbon monoxid from the fuel, and unchanged products of combustion, as a diluent. By differential speeding of the draft fan and by changing the inlet valves for air and products of combustion, the gaseous mixture escaping from the fuel bed may be made of any character desired. Preferably here it is made with an excess of oxygen over the combustible, the latter usually being relatively small in amount; particularly when evolution of heat begins from the sulfid being oxidized. Where however, the diluted atmosphere is not intended to develop heat, but to check the evolution of heat in the material being oxidized, the combustible gas is simply omitted and the oxidizing apparatus supplied with a draft current of admixed air and products of combustion in controlled proportions. Intermediate dilute atmospheres may of course be made with very small proportions of combustible.

The products of combustion from the oxidizing furnace itself may be very usefully employed. Exactly as carbon dioxid has a specific retarding action upon the formation of more carbon dioxid, so the presence of sulfur dioxid in an oxidizing atmosphere tends to restrain the formation of more sulfur dioxid from sulfur or sulfids. Therefore in burning such ores as copper glance or galena, by abstracting a portion of the effluent gases from the furnace and returning them to the air draft current entering the furnace, combustion throughout the mass can be retarded to any desired degree and temperature consequently controlled with great exactitude. It is merely a matter of regulating the relative proportions of air and products of combustion. Taking a draft current of this character, if any portion of the roasting bed of ore tends to local overheating, its own large development of sulfur dioxid combined with the large proportion of the same gas in the ambient draft current at once checks such heating and brings it back to the general average of the whole mass of ore. This specific retarding action of the sulfur dioxid upon the evolution of more sulfur dioxid is susceptible of many and varied uses within the purview of my invention. For instance where, as in the roasting of certain copper and silver ores, the object is not to burn out all the sulfur from the ore but to form sulfates, by conducting the oxidation by means of air diluted with sulfur dioxid in regulated proportions, the range of temperature within which it is possible to carry out this reaction is extended and the certainty of the operation much enhanced. A primary phenomenon in the combustion of these ores for this purpose is probably the formation of sulfites, which are unstable compounds tending to break up rather easily with evolution of sulfur dioxid, and the formation of sulfates is secondary; and oxidation of the sulfite. The presence of the sulfur dioxid in the oxidizing atmosphere, however, tends to restrain this evolution of more dioxid and to extend the range of temperature within which the sulfites are stable. Further, since the sulfates of the heavy metals have a tendency to break up with evolution of mixed oxygen and sulfur dioxid, the presence of the dioxid in the atmosphere contributes to the stability of the sulfates also. For these reasons, the use of an oxidizing atmosphere diluted with sulfur dioxid makes easy the production of large yields, even up to theory, in the case of copper, zinc, silver, nickel, cobalt, etc., sulfates. In the case of the copper sulfate, this process is very advantageous as cheapening the cost of bluestone, and it is also advantageous as a preliminary to electrolytic processes. The formation of silver sulfate in this manner gives a ready and cheap method of working certain silver ores. From pure galena lead sulfate in condition for use as a pigment can be obtained readily.

The following will serve as a specific example of the carrying out of my process, in the treatment of copper sulfid; it being unnecessary to illustrate particular apparatus, as the apparatus may be a reverberatory or any other suitable or convenient furnace. The charge having been placed within such furnace, I first heat the same preliminarily by means of a flame produced by a current of mixed air, combustible gas and sufficient products of combustion to retard combustion and give a voluminous flame burning adjacent to all parts of the mass. A flaming draft current of this character may be produced either by direct admixture of the stated gases or in the described manner by running an accelerated draft current of mixed air and products of combustion of carbon through a shallow bed of ignited fuel. Since the heat communicated is evolved, so to speak, *in situ*, a very even heating is attained without danger of overheating, as in the use of sensible heat. As the heat of the mass gradually rises and it begins to burn, the proportion of the combustible gas in the entering draft current is gradually decreased and a gradually increasing proportion of returned sulfurous products of combustion is introduced with and in the draft current, in lieu of such combustible gas. The proportion of oxygen admitted is not allowed to be large enough to cause the mass to more than glimmer, but this proportion may, and usually will necessarily be, gradually increased as the amount of unchanged sulfid in the ore decreases and the heat evolution slackens. Toward the end it may even be necessary to feed in a modicum of combustible gas with the draft current. With a little practice, sulfids may be very exactly burned to sulfates in this manner. Further, where the effluent gases from sulfur roasting are to be used for the production of acid, sulfurous or sulfuric, the use of draft currents containing sulfur dioxid is advantageous as enabling the production of such effluent gases containing maximum proportions of sulfur dioxid, since the reaction can safely be run hot and all the oxygen converted into dioxid, without danger of too violent combustion. Where, however, the retention of some or all of the sulfur in the ore is not desirable, or where the ore is to be "sweet-roasted," the use of products of combustion from ordinary coal burning furnaces, *i. e.*, the use of a gas containing carbon dioxid rather than one containing sulfur dioxid, is frequently better. Carbon dioxid has no specific retarding influence upon the evolution of sulfur dioxid and acts here merely as a neutral or inactive diluent. Sulfur dioxid may however be usefully employed also at the stage of the operation where combustion tends to become violent.

Use of dilute atmospheres of the character described is especially useful in treating galena. This ore is very hard to roast by the ordinary methods. Lead oxid and sulfid readily react together with production of metallic lead. Further oxid and sulfid are both readily fusible, and both tend to melt and inclose portions of unchanged ore. For these reasons, a dead-burned porous lead oxid produced from the original galena without fusion or other physical change was unknown prior to this invention. I have however discovered that this article, which is very adaptable to making lead salts and white lead, can be readily produced by my method. The galena is first heated by tardinly burning dilated flames of gas mixtures containing very little excess of oxygen until a point is reached where it will oxidize but short of the point where it fuses. At this stage, the combustible gas feed is discontinued, wholly or partially, and a draft current of mixed air and products of combustion employed. By regulation of the proportion of the components, the temperature can be kept stationary at the most desirable point. In finishing however, it is again desirable to use some small amount of combustible gas. Oxidation to sulfate should be avoided here. The lead oxid obtained by this process tends to retain more or less the form of the original galena and is a brown red or yellow litharge. Since it is not allowed to fuse, it does not attack the furnace linings, which, however, should as a rule be of a basic nature. In finishing, if the heat be very gradually raised and a diluted atmosphere supplied containing a small proportion of combustible gas and a relatively large proportion of air, red lead may be obtained. The porosity of the unfused litharge obtained in the roasting enables oxygen to penetrate it throughout and form red lead in the maximum quantity. Ordinary litharge which has been fused in making does not oxidize nearly as readily. By this process a useful red pigment may be obtained directly from galena, and, as it still retains the porosity of the original dead-burned galena it is susceptible of very fine division and therefore possesses great covering power.

While I do not regard steam as a diluent gas in the sense of the diluting gases mentioned, since it is not a gas and since it has not the specific retarding actions on the various types of combustion mentioned that carbon dioxid and sulfur dioxid have, yet occasionally a modicum may be used in the draft currents with advantage together with the diluent gases stated in cases where its specific chemical powers are desired, as in this method of making oxid of lead. In this process, it facilitates the decomposition of sulfite of lead and therefore helps free the ore of sulfur.

In roasting galena since the object is usually to get rid of the sulfur as quickly as possible, I prefer to use as the diluent gas in the draft currents mainly products of combustion from other furnaces, (carbon dioxid waste gases) to avoid the retarding action of sulfur dioxid.

In oxidations where, as in pyritic smelting, high temperatures are desired, my process is also useful since the employment of regulated amounts of products of combustion in the draft current supplied to the smelter enables the temperature to be regulated with an ease and certainty unknown to the usual method of working with pure air draft currents. By such use, instead of having a sudden and tumultuous heating at one stage, the heat may be evolved gradually and uniformly and thorough reaction upon the smelting ore secured.

Any convenient form of apparatus may be used to perform my broad process, it not being dependent on particular structures. The diluted air current may be forced either over or through the mass of ore being treated as the convenience or exigencies of the case may require. In the former case, it is often convenient to use furnaces of the general type of reverberatories, but, as hereinbefore stated, they may with advantage be much larger than is customary in this art, the perfect control of heat, oxidation and other conditions affecting reactions being such that great dimensions are practicable. There not being here the fear of too-violent action as in ordinary roasting in these reverberatories, draft currents may be introduced into the roasting mass of ore, in non-continuous types of furnace, to coöperate with the regular draft current of the reverberatory. Obviously, the composition of each of such draft currents will be regulated to correspond with the special needs of the ore at the point where it meets it. The ore may also be treated by draft currents blown through it in apparatus of the general type of converters. In treating lead and similar ores to prepare them for the blast furnace, a thin layer of charcoal or other suitable fuel may be placed in a shallow tilting converter, set alight and brought to incandescence by a blast of air through twyers in the bottom and the ore fed in above the fuel, the blast current being gradually charged with products of combustion as the ore begins to heat up. The heat may be controlled by proper adjustment of the composition of this diluted air blast so as to maintain the porosity of the ore until the sulfur is burned throughout or nearly throughout the mass, but it is generally desirable for this particular purpose to let the heat rise near the end of the burning and sinter the ore more or less so as to agglomerate it into denser masses suited for use in the blast furnace. Of course this fusion or sintering after the bulk of the roasting is complete has not the disadvantage that sintering has in the beginning of the operation. I have described and claimed this specific process of oxidizing ores by blowing diluted air through the masses of the same in another and divisional application, Serial No. 300,128, filed Feb. 8, 1906.

In continuous treatment any reverberatory provided with suitable mechanism for advancing the ore therethrough may be used. Rotary kilns, shaft-and-shelf furnaces and many other common types of metallurgical furnaces are also suitable. With these structures it is practicable and frequently desirable to introduce draft currents of different constitution through appropriate twyers at various points in the forward progress of the ore being treated, the draft current at any particular point being adapted to the needs of the ore at that point.

To recapitulate, my process, broadly, consists in oxidizing sulfid ores by means of diluted air. This dilution may be effected partly with combustible gas and partly with products of combustion where the diluted atmosphere is intended to evolve heat or partake of the nature of flame, or the diluent may be wholly products of combustion where checking of heat evolution in the ore is required. The products of combustion may be either those from the burning of carbon or those from the burning of sulfur, or, and very frequently, both combined.

By the use of this process, the roasting or oxidation of sulfids can be rushed, forced blast under relatively high pressures being applicable as there is here no fear of undue liberation of heat or violence of reaction. Under proper control of the conditions, the oxidation can be made nearly proportional to the amount of air delivered to the ore. As no violent reaction can take place and as the process is so regulated as to maintain porosity during the oxidation, combustion can be made to take place throughout the mass of ore instead of merely locally as in the usual methods. Of course such a forced draft carries away the sensible heat and does not permit it to accumulate. My process therefor not only makes possible the use of much larger apparatus than is usually permissible but it also enables ores to be roasted in much shorter time than has heretofore been practicable, thereby effecting a double economy. Further, since the roasting is under control of the operator handling the blast currents there is not the same need as heretofore of skilled rabblemen, neither is there a need of the heavy manual labor involved in the usual operation.

What I regard as novel and desire to claim is:—

1. The process of treating sulfid ores which consists in oxidizing such ores with draft currents of air diluted with controlled proportions of non-oxidizing gases.

2. The process of treating sulfid ores which consists in oxidizing such ores with draft currents of air diluted with products of combustion in controlled proportions.

3. The process of treating sulfid ores which consists in oxidizing such ores with draft currents of air diluted with controlled proportions of products of complete combustion and a modicum of combustible gas.

4. The process of treating sulfid ores which consists in oxidizing such ores with air diluted with controlled proportions of the products of complete combustion of carbon.

5. The process of treating sulfid ores which consists in oxidizing such ores with draft currents of air diluted with controlled proportions of combustible and incombustible products of combustion of carbon.

6. The process of treating sulfid ores which consists in oxidizing such ores with draft currents of diluted air containing controlled proportions of products of combustion and combustible gas and varying the proportion of the latter inversely to the exothermic state of the ore undergoing treatment.

7. The process of treating galena which consists in oxidizing galena with a draft current of diluted air containing controlled proportions of non-oxidizing diluent gases.

8. The process of treating galena which consists in oxidizing galena with draft currents of air diluted with products of complete combustion in controlled proportions.

9. The process of treating galena which consists in oxidizing galena with draft currents of air diluted with controlled proportions of products of combustion and a modicum of combustible gas.

10. The process of treating galena which consists in oxidizing galena with air diluted with controlled proportions of the products of combustion of carbon.

11. The process of treating galena which consists in oxidizing galena with draft currents of air diluted with controlled proportions of combustible and incombustible products of combustion of carbon.

12. The process of treating galena which consists in oxidizing galena with draft currents of diluted air and varying the dilution to correspond with the exothermic state of the ore undergoing treatment.

13. The process of treating galena which consists in oxidizing galena with draft currents of diluted air containing controlled proportions of products of combustion and combustible gas and varying the proportion of the latter inversely to the exothermic state of the ore undergoing treatment.

14. The process of treating sulfid ores which consists in oxidizing the same with an ignited draft current of air diluted with products of combustion and a modicum of combustible gas, gradually diminishing the proportion of the latter as exothermic reaction begins, continuing the treatment with a draft current of air and products of combustion alone and finally finishing with a draft current again containing combustible gas.

15. The process of treating sulfid ores which consists in oxidizing the same with an ignited draft current of air diluted with products of combustion and a modicum of combustible gas, gradually diminishing the proportion of the latter as exothermic reaction begins, continuing the treatment with a draft current of air and products of combustion alone, varying the proportion of the latter to correspond with the exothermic tendency of the sulfid mass, and finally finishing the oxidation with a draft current again containing combustible gas.

16. The process of treating galena which consists in oxidizing galena with an ignited draft current of air diluted with products of combustion and a modicum of combustible gas, gradually diminishing the proportion of the latter as exothermic reaction begins, continuing the treatment with a draft current of air and products of combustion alone, and finally finishing with a draft current again containing combustible gas.

17. The process of treating galena which consists in oxidizing the same with an ignited draft current of air diluted with products of combustion and a modicum of combustible gas, gradually diminishing the proportion of the latter as exothermic reaction begins, continuing the treatment with a draft current of air and products of combustion alone, varying the proportion of the latter to correspond with the exothermic tendency of the sulfid mass, and finally finishing the oxidation with a draft current again containing combustible gas.

18. The process of treating sulfid ores which consists in maintaining the same above the temperature necessary for oxidation but below that necessary for fusion in a diluted air current containing controlled proportions of diluent non-oxidizing gases.

19. The process of treating galena which consists in maintaining the same above the temperature necessary for oxidation but below that necessary for fusion in a diluted air current containing controlled proportions of diluent non-oxidizing gases.

20. The process of treating sulfid ores which consists in maintaining the same above the temperature necessary for oxidation but below that necessary for fusion in an air current containing controlled proportions of products of combustion.

21. The process of treating galena which consists in maintaining the same above the temperature necessary for oxidation but below that necessary for fusion in an air current containing products of combustion.

22. The process of checking undue evolution of heat in the burning of sulfid ores which consists in continuously diluting the oxidizing air current by varying amounts of products of combustion corresponding to the exothermic tendency of the mass of ore under treatment.

23. The process of checking undue evolution of heat in the burning of galena which consists in continuously diluting the oxidizing air current by varying amounts of products of combustion corresponding to the exothermic tendency of the ore under treatment.

24. The process of oxidizing sulfid ores which consists in passing over an ignited mass of such ore a draft current of diluted air containing controlled proportions of air.

25. The process of oxidizing galena which consists in passing over an ignited mass of galena a draft current of diluted air containing controlled proportions of air.

26. The continuous process of oxidizing sulfid ores which consists in passing a continuous current of such ore against a draft current of diluted air containing controlled proportions of air.

27. The continuous process of oxidizing sulfid ores which consists in passing a continuous current of such ore against a plurality of draft currents of different constitution, one or more of said draft currents being diluted air containing controlled proportions of air.

28. The continuous process of oxidizing galena which consists in passing a continuous current of such ore against a draft current of diluted air containing controlled proportions of air.

29. The continuous process of oxidizing galena which consists in passing a continuous current of such ore against a plurality of draft currents of different constitution, one or more of said draft currents being diluted air containing controlled proportions of air.

In testimony whereof I affix my signature, in the presence of two witnesses.

BYRON E. ELDRED.

Witnesses:
K. P. McELROY,
A. M. SENIOR.